(12) United States Patent
Wade et al.

(10) Patent No.: US 8,978,378 B2
(45) Date of Patent: Mar. 17, 2015

(54) METHOD AND SYSTEM FOR REDUCING TURBOCHARGER NOISE DURING COLD START

(75) Inventors: Robert Andrew Wade, Dearborn, MI (US); Fadi Maroun Naddaf, Macomb Township, MI (US); Joseph P. Whitehead, Ann Arbor, MI (US); Jason Eugene Devries, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 672 days.

(21) Appl. No.: 13/277,840

(22) Filed: Oct. 20, 2011

(65) Prior Publication Data

US 2013/0098032 A1 Apr. 25, 2013

(51) Int. Cl.
| | |
|---|---|
| *F02D 23/00* | (2006.01) |
| *F02B 33/44* | (2006.01) |
| *F02B 33/00* | (2006.01) |
| *F02B 37/18* | (2006.01) |
| *F02D 41/06* | (2006.01) |
| *F02D 41/10* | (2006.01) |
| *F02D 41/00* | (2006.01) |
| *F02B 37/16* | (2006.01) |

(52) U.S. Cl.
CPC .............. *F02B 37/18* (2013.01); *F02D 41/064* (2013.01); *F02D 41/10* (2013.01); *F02D 23/00* (2013.01); *F02D 41/0007* (2013.01); *F02D 2200/021* (2013.01); *Y02T 10/144* (2013.01); *F02B 2037/162* (2013.01)
USPC ................ 60/602; 60/601; 60/605.1; 60/611; 123/561

(58) Field of Classification Search
CPC ........ F02B 37/18; F02B 37/16; F02B 37/162; F02D 23/00; F02D 41/0007; F02D 41/064; F02D 41/10; F02D 43/00; F02D 41/0255; F02D 2200/021; Y02T 10/144
USPC ................ 60/601–602, 611, 605.1, 280, 284; 123/561, 563
IPC .................................. F02B 37/18; F02D 23/00
See application file for complete search history.

(56) References Cited

U.S. PATENT DOCUMENTS

| | | | | |
|---|---|---|---|---|
| 4,377,070 | A | | 3/1983 | Shadbourne |
| 4,551,977 | A | * | 11/1985 | Matsumura ..................... 60/611 |
| 4,612,770 | A | * | 9/1986 | Tadokoro et al. .............. 60/602 |
| 4,716,734 | A | * | 1/1988 | Nakao et al. ..................... 60/611 |
| 4,774,812 | A | | 10/1988 | Hitomi et al. |
| 5,477,839 | A | * | 12/1995 | Oshima et al. ................ 123/563 |
| 5,845,492 | A | * | 12/1998 | Isobe et al. ....................... 60/284 |
| 5,970,947 | A | * | 10/1999 | Iida et al. ....................... 123/295 |

(Continued)

FOREIGN PATENT DOCUMENTS

| | | | | |
|---|---|---|---|---|
| DE | 10331653 A1 | * | 3/2005 | .............. F02B 37/18 |
| FR | 2650860 A1 | * | 2/1991 | .............. F02B 37/12 |

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

An approach for controlling a turbocharger bypass valve is disclosed. In one example, the turbocharger bypass valve is opened during engine cold start conditions to reduce turbocharger speed. The approach may reduce noise produced by the turbocharger during engine start and warm-up.

15 Claims, 4 Drawing Sheets

(56) References Cited

U.S. PATENT DOCUMENTS

| | | | |
|---|---|---|---|
| 5,974,792 A * | 11/1999 | Isobe | 60/284 |
| 6,354,268 B1 * | 3/2002 | Beck et al. | 60/601 |
| 6,474,323 B1 * | 11/2002 | Beck et al. | 60/599 |
| 6,543,228 B2 * | 4/2003 | Deacon | 60/602 |
| 7,155,899 B2 * | 1/2007 | Beer et al. | 60/284 |
| 7,261,086 B2 * | 8/2007 | Nuang | 60/290 |
| 7,287,492 B2 * | 10/2007 | Leone et al. | 60/602 |
| 7,500,363 B2 * | 3/2009 | Hara et al. | 60/611 |
| 7,614,229 B2 * | 11/2009 | Irisawa et al. | 60/602 |
| 8,036,806 B2 * | 10/2011 | Nakamura | 701/102 |
| 8,091,359 B2 * | 1/2012 | Ulrey et al. | 60/611 |
| 8,104,281 B2 * | 1/2012 | Wade et al. | 60/602 |
| 8,186,330 B2 * | 5/2012 | Kobayashi | 123/406.29 |
| 8,209,980 B2 * | 7/2012 | Takagawa et al. | 60/602 |
| 8,234,865 B2 * | 8/2012 | Andrews | 60/602 |
| 8,429,897 B2 * | 4/2013 | Christner et al. | 60/284 |
| 2004/0163390 A1 | 8/2004 | Hummel | |
| 2007/0089400 A1 * | 4/2007 | Huang | 60/284 |
| 2008/0190107 A1 * | 8/2008 | Ogiso | 60/602 |
| 2009/0228187 A1 * | 9/2009 | Nakamura | 701/103 |
| 2010/0011764 A1 * | 1/2010 | Andrews | 60/602 |
| 2011/0011082 A1 * | 1/2011 | Mehta et al. | 60/602 |
| 2011/0139119 A1 * | 6/2011 | Kobayashi | 123/406.29 |

FOREIGN PATENT DOCUMENTS

| | | | | | |
|---|---|---|---|---|---|
| GB | 2492995 | A * | 1/2013 | | F02B 37/18 |
| JP | 62107234 | A * | 5/1987 | | F02B 37/14 |
| JP | 04301137 | A * | 10/1992 | | F02B 33/00 |
| JP | 2003003836 | A * | 1/2003 | | F02B 37/18 |
| JP | 2003254051 | A * | 9/2003 | | F02B 37/18 |
| JP | 2005140077 | A * | 6/2005 | | F02B 37/18 |

* cited by examiner

METHOD AND SYSTEM FOR REDUCING TURBOCHARGER NOISE DURING COLD START

BACKGROUND/SUMMARY

Turbo charging an engine allows the engine to provide power similar to that of a larger displacement engine while engine friction is maintained near the level of a normally aspirated engine of similar displacement. Thus, turbo charging can extend the operating region of an engine. However, during conditions where there is high flow through a compressor of the turbocharger, the compressor speed may cause increased noise, vibration, harshness (NVH), or other undesirable responses. Such noise levels may be particularly apparent during conditions where the engine operates at relatively low engine speeds, and produces relatively little noise.

For example, during cold start conditions, the engine may be controlled to increase the volumetric efficiency of the engine in order to maximize the flow rate of heated exhaust gas through an exhaust after-treatment device to more quickly heat the exhaust after-treatment device to a suitable operating temperature. By increasing the flow rate of exhaust gas and/or intake air, the speed of the turbocharger is increased and an unbalance of rotating components in the turbocharger excites the engine and exhaust structure, which results in increased noise. On the other hand, although the flow rate is increased, the engine speed remains relatively low and produces relatively little noise. Accordingly, the turbocharger is perceived as being excessively loud relative to other components of the engine during these conditions.

The inventors herein have recognized the above-mentioned issues and have developed a method for reducing noise generated by the turbocharger, comprising: opening a turbocharger bypass valve to reduce a turbocharger speed responsive to a cold start condition.

In one example, by opening the turbocharger bypass valve, air/exhaust flow is recirculated around a compressor absorbing more shaft work and thus decreasing the speed of the turbocharger. During this event the exhaust flow is unchanged and the engine continues to provide the increased level of high temperature exhaust to the aftertreatment device. The reduction in speed of the turbocharger causes the noise level of the turbocharger to be reduced to a suitable level that is more aligned with the level of noise produced by the engine at idle.

In another example, by opening the turbocharger bypass valve, the energy of the exhaust stream bypasses the turbine and it is not able to provide the work required for a high turbocharger speed. The speed reduction results in a reduction of the NVH condition.

Moreover, during a cold start condition, the likelihood of a significant acceleration request (e.g., tip-in) is low. Accordingly, throttle response penalties due to turbocharger lag as a result of reducing the turbocharger speed rarely may be realized. Further, in some embodiments, the method may include closing the turbocharger bypass valve responsive to an acceleration request being greater than an acceleration threshold. The turbocharger bypass valve is closed to increase the turbocharger speed for reduced turbocharger lag and better vehicle launch readiness. Upon vehicle launch and acceleration, the engine speed is increased, and correspondingly the engine noise level becomes loud enough that the noise generated by the turbocharger is absorbed or drowned out by the engine noise. In other words, under these conditions, the noise generated by the turbocharger is no longer perceived as being excessively loud compared to the other components of the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The subject matter of the present disclosure will be better understood from reading the following detailed description of non-limiting embodiments, with reference to the attached drawings, wherein.

DETAILED DESCRIPTION

Figure 1:
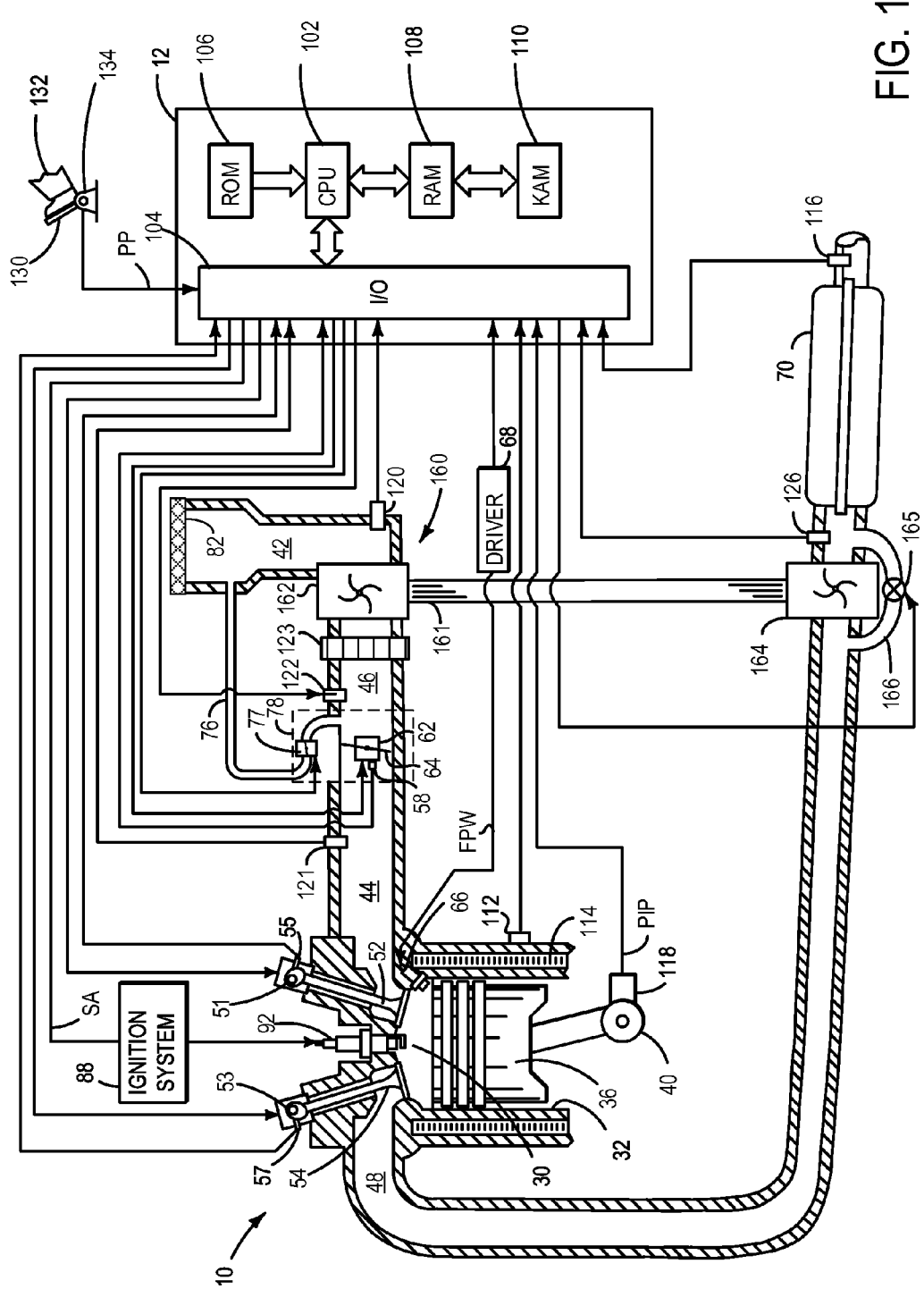
FIG. 1 shows a schematic depiction of an engine and turbocharger.
Figure 2A:
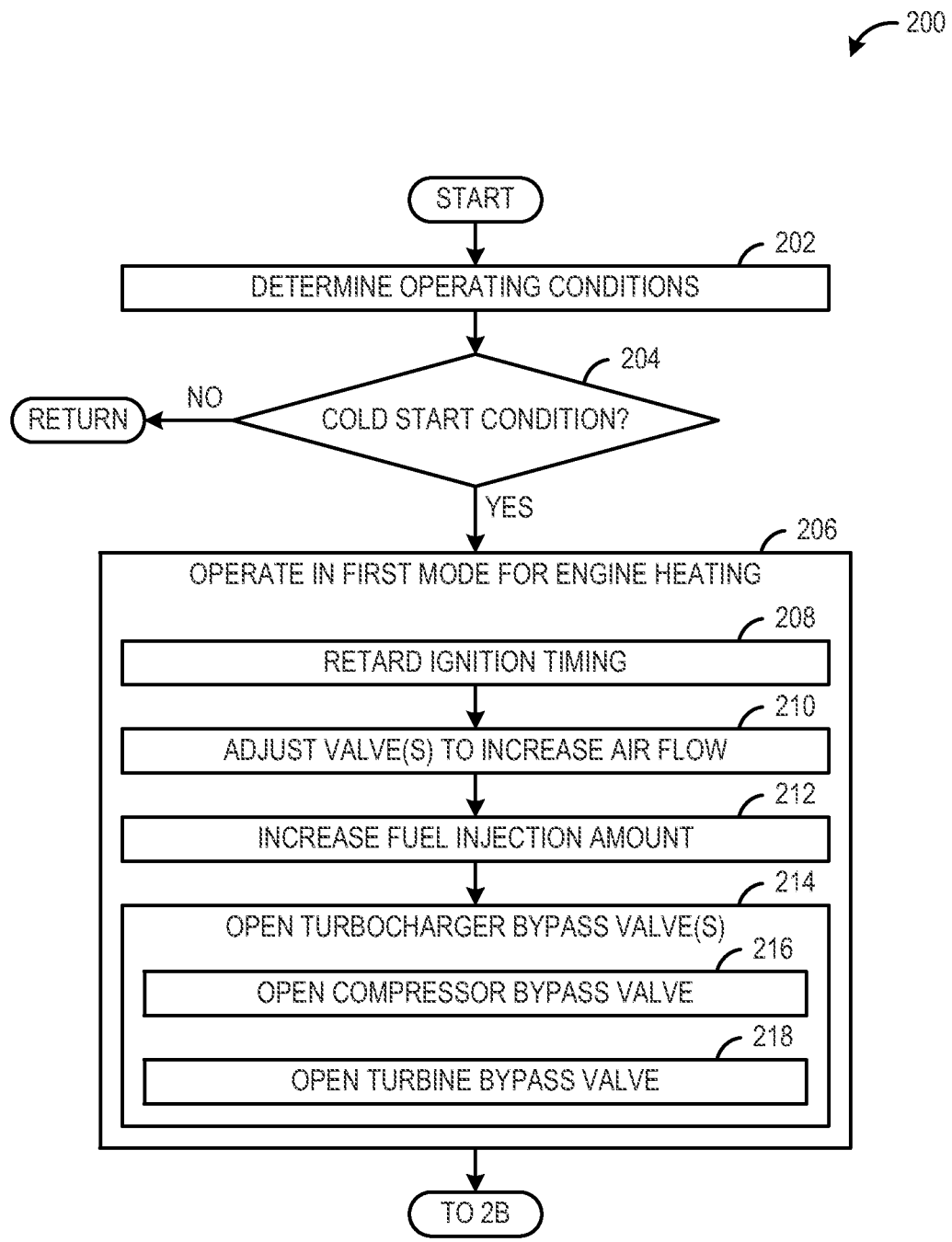
FIGS. 2A and 2B show a high level flowchart of a method for controlling an engine including a turbocharger.
Figure 2B:
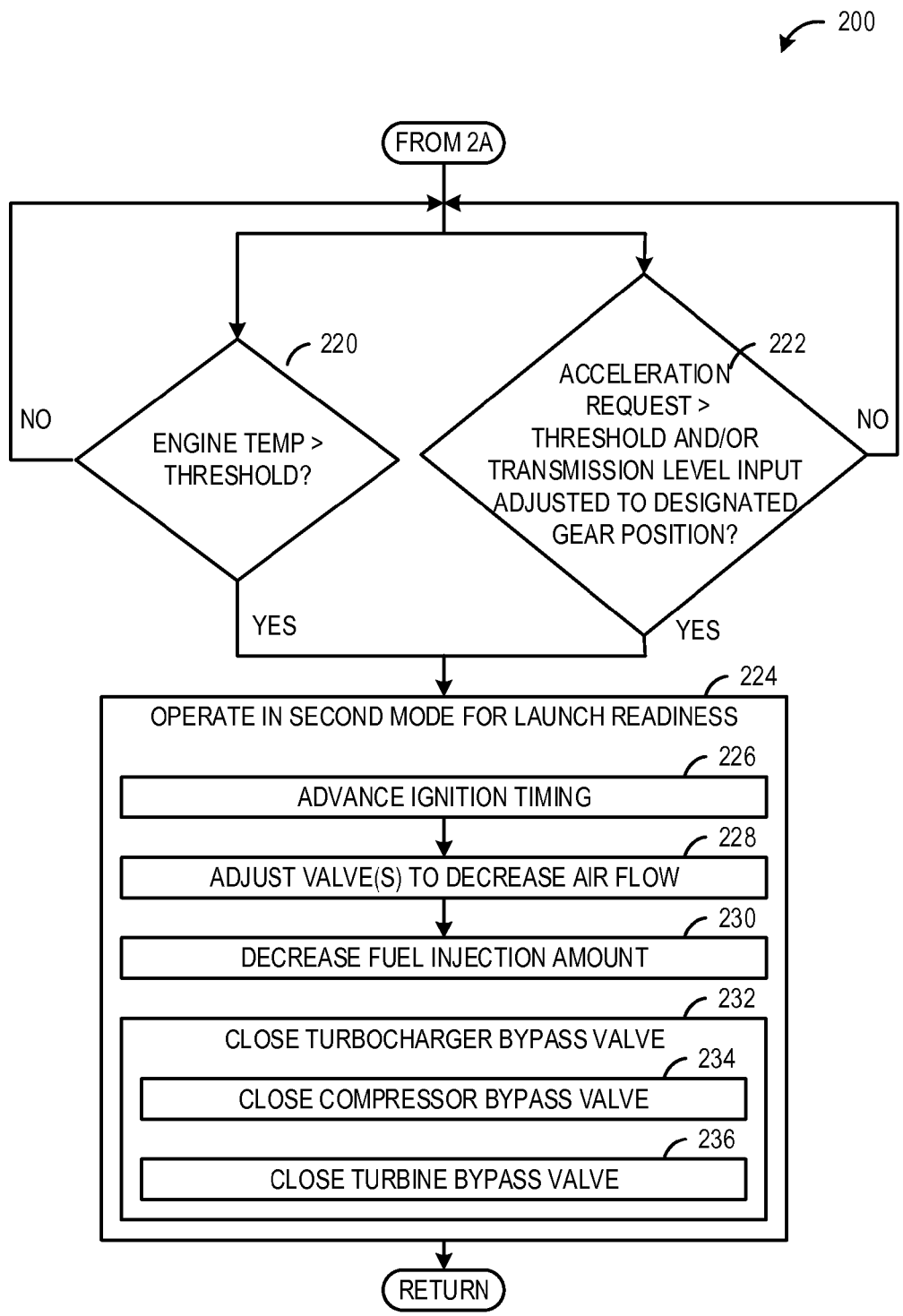
Figure 3:
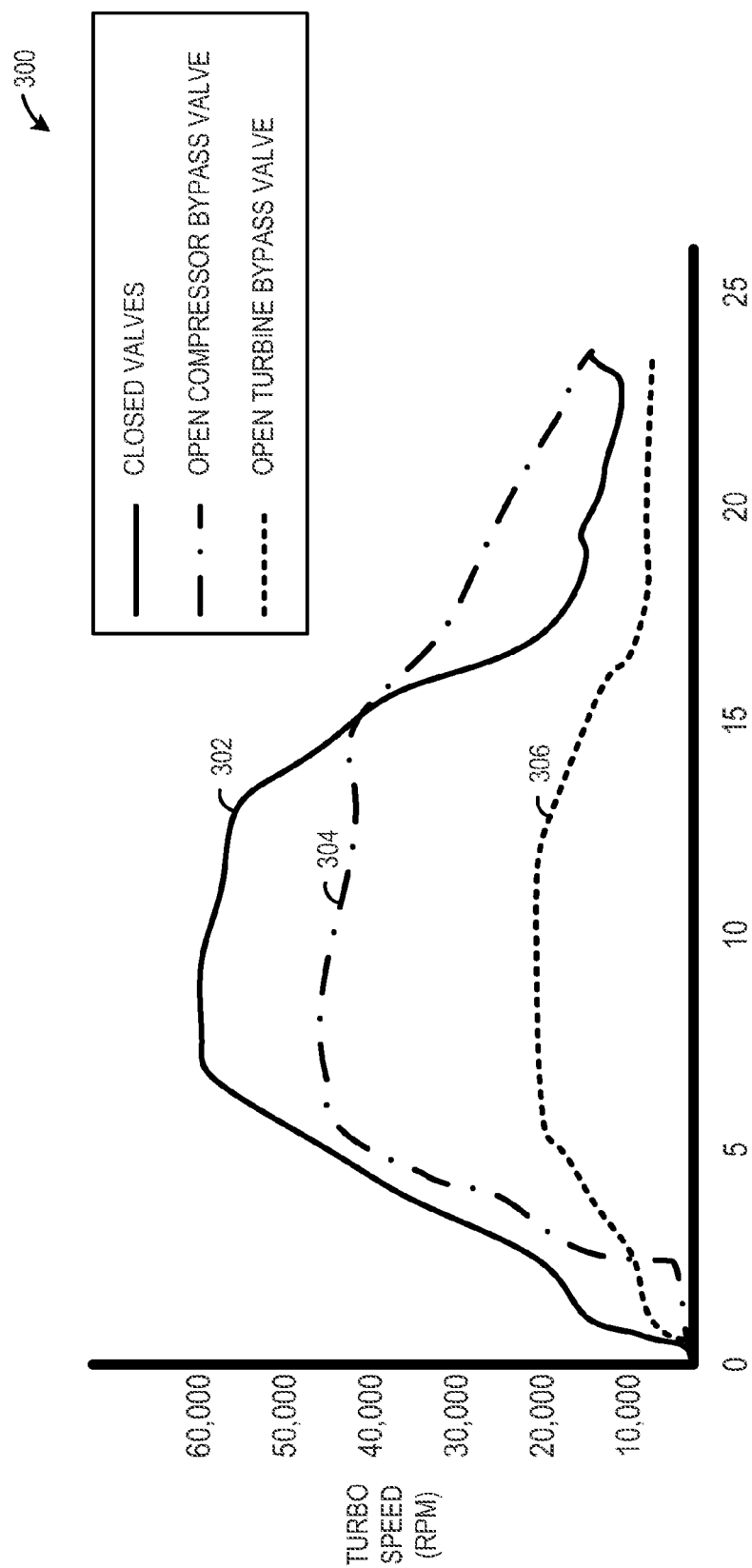
FIG. 3 shows a graph depicting turbocharger speed relative to various states of different turbocharger bypass valves.

The present description is related to operating an engine including a turbocharger coupled. More particularly, the present description is related to operating a turbocharger in manner in which noise generated by operation of the turbocharger is reduced under some conditions. FIG. 1 shows an example engine that includes a turbocharger and turbocharger bypass valves. A turbocharger bypass valve may include a suitable valve that directs intake air around a compressor of a turbocharger or exhaust gas around a turbine of a turbocharger. FIGS. 2A and 2B show a high level flowchart for controlling an engine including a turbocharger. FIG. 3 shows a graph depicting turbocharger speed relative to various states of different turbocharger bypass valves. More particularly, the graph illustrates how turbocharger speed, and correspondingly noise generated by operation of the turbocharger, is reduced by opening different turbocharger bypass valves.

Referring to FIG. 1, internal combustion engine 10, comprises a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with throttle body 78 including electronic throttle 62 which adjusts a position of throttle plate 64 to control air flow from intake boost chamber 46. In other examples, the throttle may be mechanically operated by a vehicle driver.

Compressor 162 draws air through air filter 82 and air intake 42 to supply boost chamber 46. A charge air cooler 123 is used to increase the density of the air after the compressor. Exhaust gases spin turbine 164 which is coupled to compressor 162 via shaft 161 of turbocharger 160. Turbine bypass valve (or waste gate actuator) 165 may be electrically operated by controller 12 to direct exhaust gas through conduit 166 to bypass turbine 164 so that boost pressure and/or turbocharger speed can be controlled under varying operating conditions. In some embodiments, turbine bypass valve 165 may be vacuum, pressure, or electrically operated. In some embodiments, turbine bypass valve may be omitted from the engine 10. Compressor bypass valve (CBV) 77 may be operated electronically or electro-pneumatically via controller 12 to direct air from the outlet of compressor 162 to the inlet of compressor 162 via conduit 76. Boost pressure in boost chamber 46 and/or turbocharger speed may be reduced when compressor bypass valve 77 is opened since output of compressor 162 is fed back to the input of compressor 162 thus increasing compressor mass flow, reducing turbo speed, and decreasing boost pressure in 46. The compressor bypass valve may also be referred to as a compressor recirculation valve (CRV). Note that compressor bypass valve 77 and turbine bypass valve 165 each may be referred to as turbocharger bypass valves because each valve directs flow around a component of turbocharger 160. The turbine bypass valve may also be referred to as a wastegate by those skilled in the art. The turbocharger bypass valves may be controlled to vary a turbocharger speed under varying operating conditions.

It will be appreciated that the CBV and/or the CRV may take various forms. For example, each valve could be electric or pneumatic. Moreover, the signals to control operation of such electric valves could be digital or proportional. In some implementations, a valve could be placed in the compressor or turbine castings. In some embodiments, a valve could be located remotely in the air induction system or the exhaust piping.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine exhaust gases are directed to converter 70. Converter 70 can include multiple catalyst bricks, in one example. In another example, multiple exhaust after-treatment or emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; additionally or alternatively the position sensor 134 is coupled to a transmission level input gear for sensing a transmission level input based on the gear position (which may or may not be provided by a vehicle operator); a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); an exhaust temperature sensor 116 for determining the temperature of exhaust gas exiting converter 70 and correspondingly the temperature of converter 70; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

The system shown in FIG. 1 provides for controlling operation of a turbocharger to reduce noise generated to operation of the turbocharger, under some conditions. The system comprises: a turbocharger coupled to an engine; a compressor bypass valve positioned along a flow path between an inlet and an outlet of a compressor of the turbocharger; and a controller operable to open the compressor bypass valve to decrease a turbocharger speed responsive to a cold start condition. The cold start condition may include an engine temperature being less than a temperature threshold. In one example, the engine temperature is an engine coolant temperature and the temperature threshold is twenty five degrees Celsius. During the cold start condition, the engine enters a spark retard and enrichment mode to more quickly heat the engine and converter to a suitable operating temperature. In particular, the volumetric efficiency is increased and the combustion product is enriched to increase the amount of heated exhaust gas that is produced and that flows through the converter. In some implementations, during the spark retard and enrichment mode, the controller is operable to retard an ignition timing of spark plugs of the engine relative to ignition timing during an engine idle condition in which the engine has not cooled to ambient temperature (e.g., a hot re-start such as from idle stop-start conditions), after engine cranking and speed run-up, and the engine speed has stabilized, adjust the throttle valve to increase air flow to one or more cylinders of the engine relative to a throttle position during the engine idle condition; and increase a fuel injection amount to the one or more cylinders of the engine relative to the fuel injection amount during the engine idle condition. It will be appreciated that the controller may adjust alternative or additional operating parameters during the spark retard and enrichment mode without departing from the scope of the present description.

The operation during the cold start condition and in the spark retard and enrichment mode causes the engine speed and the air flow to increase, which in turn, causes the turbocharger speed to increase. The natural unbalance of the rotating components excites the structure of the engine and exhaust, which results in excessive noise. In order to reduce the noise level, the controller opens the compressor bypass valve during the cold start condition. When the compressor bypass valve is opened the turbocharger has to pump more air, but a fixed amount of work is available from the turbine and thus the speed of the turbocharger decreases. The decrease in turbocharger speed correspondingly results in a reduction in noise.

In some implementations, the controller is operable to close the compressor bypass valve to increase the turbocharger speed responsive to the engine temperature being greater than the temperature threshold. In one example, the temperature threshold is set at approximately a converter light-off temperature. Once the engine and converter are heated to a suitable operating temperature, the controller transitions from engine warm-up mode to launch readiness mode. In launch readiness mode, the compressor bypass valve is closed to increase the speed of the turbocharger in preparation for vehicle launch responsive to an acceleration request. By increasing the turbocharger speed, turbocharger lag due to spool up is reduced and launch response is quicker. In engine warm-up mode, reduced turbocharger noise may be prioritized, because the vehicle is idling and relatively quiet. Further, there is a low likelihood of immediate vehicle acceleration, so quick acceleration response is not as high of a priority. On the other hand, launch readiness mode, acceleration response may be prioritized over reduced turbocharger noise, because there is a higher likelihood for an acceleration request, where a quick acceleration response would be desired.

In some implementations, the controller is operable to close the turbocharger bypass valve responsive to an acceleration request being greater than an acceleration threshold. In one example, the acceleration threshold is set to substantially little or no acceleration. As discussed above, the controller closes the compressor bypass valve in preparation for launch readiness for a quicker acceleration response.

In some embodiments, the controller is operable to close the turbocharger bypass valve responsive to receiving a change in a gear position of a transmission level input to a designated gear position. The change in transmission level may indicate that the vehicle is being prepared for launch.

In some implementations, the controller opens the compressor bypass valve when the engine operates in spark retard and enrichment mode and closes the compressor bypass valve when the engine switches to another mode of operation. Otherwise, during other modes of engine operation, the compressor bypass valve control strategy functions to relieve boost pressure in the intake boost chamber under some conditions, such as during tip-out when the throttle valve closes and the compressor continues to spin.

In some implementations, the system further comprises a turbine bypass valve positioned along a flow path between an inlet and an outlet of a turbine of the turbocharger; and the controller is operable to open the compressor bypass valve and the turbine bypass valve to decrease the turbocharger speed responsive to the cold start condition. Furthermore, the controller is operable to close the compressor bypass valve and the turbine bypass valve to increase the turbocharger speed responsive to the engine temperature being greater than the temperature threshold. The controller is operable to close the compressor bypass valve and the turbine bypass valve to increase the turbocharger speed responsive to the acceleration request being greater than the acceleration threshold.

In addition the system shown in FIG. 1 provides for controlling operation of a turbocharger to reduce noise generated to operation of the turbocharger, under some conditions. The system comprises: a turbocharger coupled to an engine including one or more cylinders; a turbocharger bypass valve positioned along an flow path between an inlet and an outlet of a compressor of the turbocharger or an flow path between an inlet and an outlet of a turbine of the turbocharger; a throttle valve positioned downstream of the outlet of the compressor and the compressor bypass valve; and a controller.

In some embodiments, the turbocharger bypass valve is a compressor bypass valve that is positioned along the flow path between the inlet and the outlet of the compressor. In some embodiments, the turbocharger bypass valve is a turbine bypass valve that is positioned along the air flow path between the inlet and the outlet of the turbine.

The controller is operable, in a first mode, to retard an ignition timing of the engine, adjust the throttle valve to increase air flow to the one or more cylinders, increase a fuel injection amount to the one or more cylinders, and open the turbocharger bypass valve to decrease a turbocharger speed. The turbocharger speed is decreased to reduce noise generated by operation of the turbocharger. In some implementations, the controller operates in the first mode responsive to an engine temperature being less than a temperature threshold and an acceleration request being less than an acceleration threshold.

Furthermore, the controller is operable, in a second mode, to close the turbocharger bypass valve to increase the turbocharger speed. In some implementations, the controller is operable to advance the ignition timing of the engine, adjust the throttle valve to decrease air flow to the one or more cylinders, and decrease the fuel injection amount to the one or more cylinders relative to the first mode in the second mode. In some implementations, the controller is operable to switch from operation in the first mode to operation in the second mode responsive to the engine temperature being greater than the temperature threshold or the acceleration request being greater than the acceleration threshold.

Referring now to FIGS. 2A and 2B, a method 200 for controlling an engine including a turbocharger is shown. More particularly, method 200 is performed to control operation of a turbocharger bypass valve to reduce noise generated from operation of the turbocharger, under some conditions. In one example, method 200 may be executed via instructions of controller 12 in the system as shown in FIG. 1. Further, method 200 may provide the operating sequence illustrated in FIGS. 2A and 2B.

Referring to FIG. 2A, at 202, method 200 includes determining engine operating conditions. Engine operating conditions may include but are not limited to engine speed, engine air amount, engine temperature, converter temperature, requested acceleration or acceleration demand, engine torque demand, ambient temperature, and ambient pressure.

At 204, method 200 includes determining a cold start condition. In one example, the cold start condition may be based on the engine temperature. For example, the cold start condition may include the engine temperature being less than a temperature threshold. In some embodiments, the cold start condition is determined based on an engine coolant temperature, a converter/exhaust temperature, ambient temperature, or a combination thereof. In one particular example, the engine temperature is based on the engine coolant temperature and the temperature threshold is twenty five degrees Celsius.

In one example, the cold start condition describes a situation where a vehicle is in an engine idle condition immediately following an engine speed run-up from cranking, and the engine is relatively quiet, and there is no acceleration request to launch the vehicle. If there is a cold start condition, method 200 moves to 206. Otherwise, method 200 returns to other operations.

At 206, method 200 operates in a first mode for heating the engine responsive to the cold start condition. In the first mode, engine operation is adjusted to more quickly heat the engine and converter to suitable operating temperatures. At 208, method 200 includes retarding ignition timing of spark plugs of the engine. In one example, the ignition timing is retarded relative to ignition timing during an engine idle condition in which the engine has not cooled to ambient temperature (e.g., a hot re-start such as from idle stop-start conditions), after engine cranking and speed run-up, and the engine speed has stabilized. By retarding the ignition timing and opening the throttle, the amount of heated exhaust gas that is expelled into the exhaust manifold may be increased. The increased amount of heated exhaust gas may travel through the converter to more quickly heat the converter.

At 210, method 200 includes adjusting a valve to increase air flow to one or more cylinders of the engine. In some embodiments, the throttle valve is adjusted to increase air flow to the one or more cylinders. In some embodiments, an intake/exhaust valve timing/lift is adjusted to increase air flow to the one or more cylinders. In one particular example, the intake/exhaust valve timing and lift is adjusted to provide maximum air flow/air charge to the one or more cylinder for the current operating conditions. In one example, the valve is adjusted to increase air flow relative to a valve position and air flow amount during the idle condition (e.g., a hot re-start such as from idle stop-start conditions). By adjusting the valves to provide increased air flow, the volumetric efficiency of the engine may be increased in order to increase the flow rate of heated exhaust gas through the converter to more quickly heat the converter.

At 212, method 200 includes increasing a fuel injection amount to one or more cylinders of the engine. In one example, the fuel injection amount is increased relative to the fuel injection amount during the idle condition (e.g., a hot re-start such as from idle stop-start conditions). By increasing the fuel injection amount, the chemical energy of the exhaust gas may be increased to more quickly heat the converter.

In one example, retarding the ignition timing, opening the throttle, and increasing the fuel injection amount may be referred to as operation in a spark retard and enrichment mode. As a result of such operation, engine speed is increased (e.g., up to 1250 RPM) and air flow is increased causing the turbocharger speed to increase. In order to reduce the noise generated by the turbocharger while operating in the spark retard and enrichment mode, at 214, method 200 includes opening one or more turbocharger bypass valves to reduce the turbocharger speed responsive to the cold start condition.

In some embodiments, at 216, method 200 includes opening a compressor bypass valve to direct intake air around the compressor. In some embodiments, at 218, method 200 includes opening a turbine bypass valve to direct intake air around the turbine. In some embodiments, method 200 includes opening the compressor bypass valve and the turbine bypass valve. In some embodiments, one bypass valve may be opened at a first engine speed threshold and the other bypass valve may be opened at a second engine speed threshold that is higher than the first engine speed threshold. By opening one or more of the turbocharger bypass valves, air is directed around the compressor and/or exhaust gas is directed around the turbine, which results in a decrease in the turbocharger speed, and correspondingly a decrease in noise generated by operation of the turbocharger.

Turning to FIG. 2B, at 220, method 200 includes determining if the engine temperature is greater than a temperature threshold. The temperature threshold may be set to a suitable engine warm-up temperature. Additionally or alternatively, the method may determine if the converter temperature is greater than a temperature threshold. In one example, the temperature threshold may be the light-off temperature of the converter. If it is determined that the engine temperature is greater than the temperature threshold, method 200 moves to 224. Otherwise, method 200 returns to 220.

At 222, method 200 includes determining if an acceleration request is greater than an acceleration threshold. The acceleration threshold may be set to a suitable magnitude of acceleration request. In one example, the acceleration threshold is based on a pedal position of the accelerator pedal, and the acceleration threshold is set at a pedal position of five percent. Additionally or alternatively, the method may determine if a torque demand is greater than a torque threshold. If it is determined that the acceleration request is greater than the acceleration threshold, method 200 moves to 224. Otherwise, method 200 returns to 222.

In some embodiments, method 200 may perform 220 and 222 in parallel. For example, if either the temperature or the acceleration request exceeds the threshold, method 200 exits operation in the first mode. Further, in some embodiments, the method switches from operation in the first mode to operation in a second mode responsive to the engine temperature being greater than the temperature threshold or the acceleration request being greater than the acceleration threshold.

Additionally or alternatively, the method includes determining if a transmission level input is adjusted to a designated gear position. For example, the transmission level input may be changed from a "park" position or "neutral" position to a "drive" position or a "reverse" position. In some cases, the change in gear position of the transmission level input may be received from a vehicle operator. If the designated gear position of the transmission level input is received, method 200 moves to 224. Otherwise, method returns to 222.

At 224, method 200 includes operating in a second mode for launch readiness. In the second mode, the engine and converter are heated to a suitable operating temperature and/or vehicle launch response is prioritized over reduced turbocharger noise.

At 226, method 200 includes advancing ignition timing of spark plugs of the engine. The ignition timing may be advanced if the engine is heated to a suitable operating temperature.

At 228, method 200 includes adjusting the valve(s) to decrease air flow to one or more cylinders of the engine. In some embodiments, the valve(s) may include the throttle valve and/or intake/exhaust valves. The valve is adjusted to decrease air flow if the engine is heated to a suitable operating temperature.

At 230, method 200 includes decreasing the fuel injection amount to one or more cylinders of the engine. The fuel injection amount may be decreased if the engine is heated to a suitable operating temperature.

At 232, method 200 includes closing the turbocharger bypass valve(s). In some embodiments, at 234, method 200 includes closing the compressor bypass valve. In some embodiments, at 236, method 200 includes closing the turbine bypass valve. In embodiments where both bypass valves are open during operation in the first mode, the method includes closing both bypass valves in the second mode. The turbocharger bypass valves are closed in order to prepare for vehicle launch by increasing the turbocharger speed. By increasing the turbocharger speed, turbocharger lag may be reduced and vehicle launch response may be quicker. Moreover, typically once the engine is heated to a suitable operating temperature, the likelihood of an acceleration request increases, and launch readiness is prioritized over turbocharger noise reduction.

Thus, method 200 provides for a method for controlling an engine including a turbocharger, comprising: opening a turbocharger bypass valve to reduce a turbocharger speed responsive to a cold start condition. In one example, the turbocharger bypass valve is a compressor bypass valve. In another example, the turbocharger bypass valve is a turbine bypass valve. In one example, the cold start condition includes an engine temperature being less than a temperature threshold. The method further comprises: closing the turbocharger bypass valve to increase the turbocharger speed responsive to the engine temperature being greater than the temperature threshold. Further, the cold start condition includes an acceleration request being less than an acceleration threshold. The method further comprises: closing the turbocharger bypass valve to increase the turbocharger speed responsive to the acceleration request being greater than the acceleration threshold. The method further comprises: during the cold start condition, retarding an ignition timing; adjusting a throttle valve to increase air flow to one or more cylinders of the engine; and increasing a fuel injection amount to one or more cylinders of the engine.

As will be appreciated by one of ordinary skill in the art, the methods described in FIGS. 2A and 2B may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Moreover, in some embodiments, one or more steps may be omitted without departing from the scope of the present disclosure.

Referring to FIG. 3, a graph 300 depicts turbocharger speed relative to various states of different turbocharger bypass valves. As discussed above, the turbocharger speed corresponds to the level of noise generated by operation of the turbocharger. For example, within a given operating range, noise generated by operation of the turbocharger increases as turbocharger speed increases. Likewise, noise generated by operation of the turbocharger decreases as turbocharger speed decreases. Line 302 represents the turbocharger speed when no turbocharger bypass valve is open. Line 304 represents the turbocharger speed when the compressor bypass valve is open. Line 306 represents the turbocharger speed when the turbine bypass valve is open. As illustrated, when either of the compressor bypass valve is open or the turbine bypass valve is open, the turbocharger speed is reduced. The compressor bypass valve reduces turbocharger speed somewhat while the wastegate reduces turbocharger speed by a significant amount that noticeably reduces the level of noise generated by the turbocharger. In some cases, although the turbine bypass valve provides a greater drop in speed, the compressor bypass valve may be opened instead. For example the systems for opening the turbine bypass valve may be expensive, require new control strategies, and require calibration.

In another embodiment, a method for operating the engine includes: for a first engine start from rest in which the engine has cooled to ambient conditions, after engine cranking and speed run-up, and the engine speed has stabilized at a first increased idle, opening the compressor bypass valve from a closed position while correspondingly adjusting a throttle position to maintain an increased airflow through the engine with retarded spark timing, the turbocharger spinning at a first speed; and for a second engine start from rest, different than the first, the second start one in which the engine has not cooled to ambient (e.g., a hot re-start such as from idle stop-start conditions), after engine cranking and speed run-up, and the engine speed has stabilized at a second decreased idle, maintaining the compressor bypass valve closed while operating with the throttle positioned to maintain a decreased airflow (relative to the first engine start) through the engine with less retarded spark timing (e.g., advanced timing or timing at peak torque timing), the turbocharger spinning at a second, higher speed as compared to the first speed.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for controlling an engine including a turbocharger, comprising:
    opening a turbocharger bypass valve to reduce a turbocharger speed responsive to a cold start condition, and
    closing the turbocharger bypass valve to increase the turbocharger speed responsive to receiving a change in a gear position of a transmission level input to a designated gear position.

2. The method of claim 1, wherein the turbocharger bypass valve is a compressor bypass valve.

3. The method of claim 1, wherein the turbocharger bypass valve is a turbine bypass valve.

4. The method of claim 1, wherein the cold start condition includes an engine temperature being less than a temperature threshold, and the turbocharger bypass valve being opened during an engine idle condition immediately following an engine speed run-up from cranking, and where the turbocharger bypass valve is further adjusted responsive to the gear position of the transmission level input from a vehicle operator.

5. The method of claim 1, further comprising:
closing the turbocharger bypass valve to increase the turbocharger speed responsive to engine temperature being greater than a temperature threshold.

6. The method of claim 1, further comprising:
closing the turbocharger bypass valve to increase the turbocharger speed responsive to an acceleration request being greater than an acceleration threshold.

7. The method of claim 1, further comprising:
during the cold start condition, retarding an ignition timing;
adjusting a throttle valve or intake/exhaust valve timing to increase air flow to one or more cylinders of the engine; and
increasing a fuel injection amount to one or more cylinders of the engine.

8. A system comprising:
a turbocharger coupled to an engine;
a compressor bypass valve positioned along a flow path between an inlet and an outlet of a compressor of the turbocharger; and
a controller operable to open the compressor bypass valve to decrease a turbocharger speed responsive to a cold start condition, wherein the cold start condition includes an engine temperature being less than a temperature threshold, wherein the controller is operable to close the compressor bypass valve to increase the turbocharger speed responsive to receiving a change in a gear position of a transmission level input to a designated gear position.

9. The system of claim 8, wherein the controller is operable to close the compressor bypass valve to increase the turbocharger speed responsive to the engine temperature being greater than the temperature threshold.

10. The system of claim 8, wherein the controller is operable to close the compressor bypass valve to increase the turbocharger speed responsive to an acceleration request being greater than an acceleration threshold.

11. The system of claim 8, wherein the controller is operable to, during the cold start condition, retard an ignition timing of spark plugs of the engine, adjust a throttle valve to increase air flow to one or more cylinders of the engine; and increase a fuel injection amount to the one or more cylinders of the engine.

12. The system of claim 8, further comprising:
a turbine bypass valve positioned along a flow path between an inlet and an outlet of a turbine of the turbocharger; and
the controller being operable to open the compressor bypass valve and the turbine bypass valve to decrease the turbocharger speed responsive to the cold start condition.

13. A system comprising:
a turbocharger coupled to an engine including one or more cylinders;
a turbocharger bypass valve positioned along a flow path between an inlet and an outlet of a compressor of the turbocharger or a flow path between an inlet and an outlet of a turbine of the turbocharger;
a throttle valve positioned downstream of the outlet of the compressor and a compressor bypass valve;
a controller operable, in a first mode, to retard an ignition timing of the engine, adjust the throttle valve to increase air flow to the one or more cylinders, increase a fuel injection amount to the one or more cylinders, and open the turbocharger bypass valve to decrease a turbocharger speed, and operable, in a second mode, to close the turbocharger bypass valve to increase the turbocharger speed, wherein the turbocharger bypass valve is the compressor bypass valve that is positioned along the flow path between the inlet and the outlet of the compressor.

14. The system of claim 13, wherein the controller operates in the first mode responsive to an engine temperature being less than a temperature threshold.

15. The system of claim 14, wherein the controller switches from operation in the first mode to operation in the second mode responsive to the engine temperature being greater than the temperature threshold or an acceleration request being greater than an acceleration threshold or a gear position of a transmission level input being changed to a designated gear position.

* * * * *